Aug. 3, 1965 G. A. ZIPPEL 3,198,592
APPARATUS FOR EFFECTING THE SHIFTING OF SHELF OR
CABINET UNITS FOR FILING SYSTEMS
Filed Dec. 19, 1963 9 Sheets-Sheet 1

INVENTOR.
GEORG ALFRED ZIPPEL
BY
Woodhams, Blanchard & Flynn
ATTORNEYS

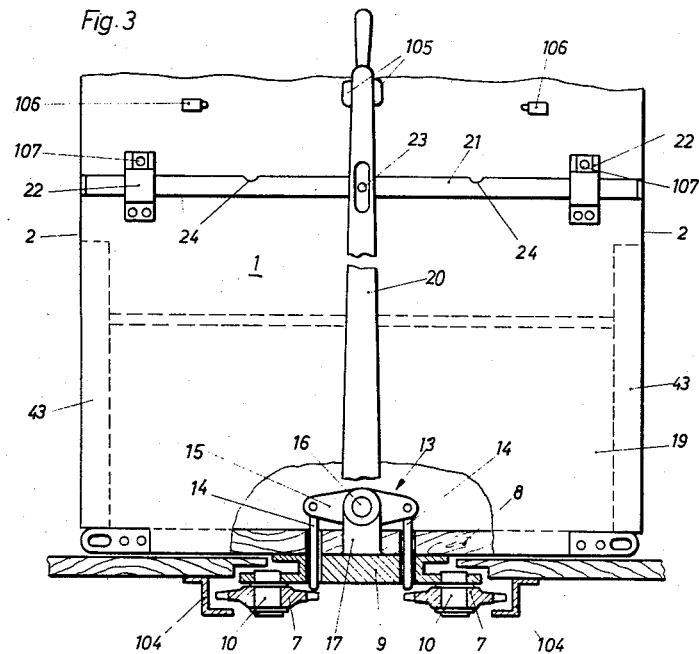
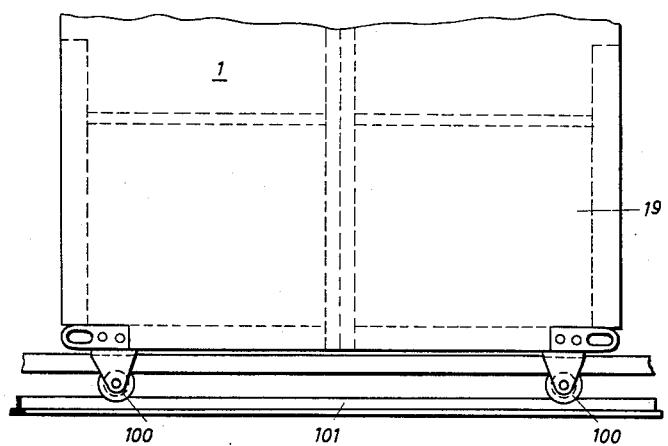

Aug. 3, 1965 G. A. ZIPPEL 3,198,592
APPARATUS FOR EFFECTING THE SHIFTING OF SHELF OR
CABINET UNITS FOR FILING SYSTEMS
Filed Dec. 19, 1963 9 Sheets-Sheet 3

INVENTOR.
GEORG ALFRED ZIPPEL
BY
*Woodhams, Blanchard & Flynn*
ATTORNEYS

Aug. 3, 1965     G. A. ZIPPEL     3,198,592
APPARATUS FOR EFFECTING THE SHIFTING OF SHELF OR
CABINET UNITS FOR FILING SYSTEMS
Filed Dec. 19, 1963     9 Sheets-Sheet 4

INVENTOR.
GEORG ALFRED ZIPPEL
BY
*Woodhams, Blanchard & Flynn*
ATTORNEYS

INVENTOR.
GEORG ALFRED ZIPPEL
BY
ATTORNEYS

Aug. 3, 1965 G. A. ZIPPEL 3,198,592
APPARATUS FOR EFFECTING THE SHIFTING OF SHELF OR
CABINET UNITS FOR FILING SYSTEMS
Filed Dec. 19, 1963 9 Sheets-Sheet 7
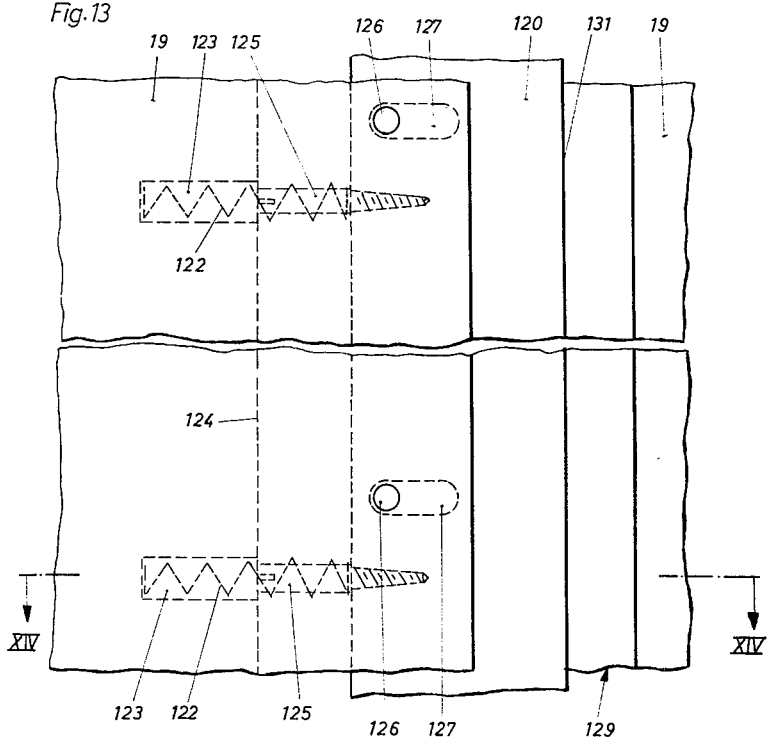
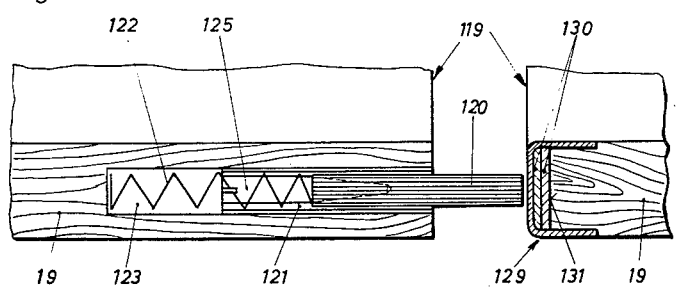
INVENTOR.
GEORG ALFRED ZIPPEL
BY
Woodhams, Blanchard & Flynn
ATTORNEYS

INVENTOR.
GEORG ALFRED ZIPPEL
BY
ATTORNEYS

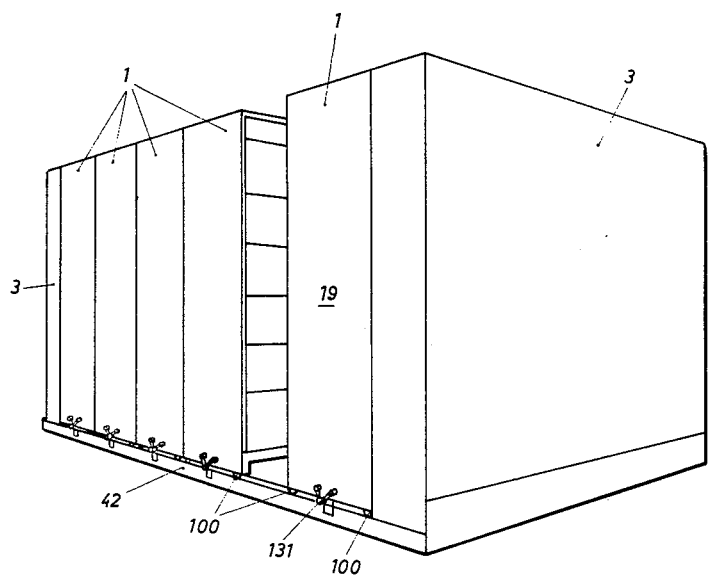

United States Patent Office 3,198,592
Patented Aug. 3, 1965

3,198,592
APPARATUS FOR EFFECTING THE SHIFTING OF SHELF OR CABINET UNITS FOR FILING SYSTEMS
Georg Alfred Zippel, Altdorf, near Nurnberg, Germany
Filed Dec. 19, 1963, Ser. No. 331,689
Claims priority, application Germany, Dec. 24, 1962,
Z 9,830; June 27, 1963, Z 10,197; Oct. 31, 1963,
Z 10,442
18 Claims. (Cl. 312—198)

This invention relates to an apparatus for effecting the shifting of shelf or cabinet units for filing systems, which units are located behind each other on tracks and have their access sides facing each other. The shifting units can be arranged between two stationary shelf or cabinet units and the units are arranged so that an access passageway can be formed between any two adjacent units. The apparatus comprises a drive arrangement, preferably including an electric motor, for driving at least one endless chain, belt, cable, etc., preferably located in the floor underneath the units, and of a coupling device for selectively connecting each of the movable shelf or cabinet units to the chain, belt, cable, etc. Such connection can be effected by means located adjacent a side wall of the units which is accessible for service.

Shelf or cabinet units of this type intended for filing purposes, such as that disclosed in German Patent No. 617,966, are used for storing in the smallest possible space the greatest possible amount of objects to be filed, such as card systems, hanging files, boxes for written materials, lying and standing files, or perhaps even materials for permanent filing. This is made possible by placing the shelf or cabinet units directly behind each other without intermediate space except that provision is made for forming a single open passageway between any two adjacent units. A special safety device is provided to insure that the shelf or cabinet units bordering the passageway cannot be pushed together unintentionally while somebody is in the passageway. Also, in order to make possible a lateral shifting of these known shelf and cabinet units, the endless chain running in the floor has been arranged in such a manner that the two reaches thereof are vertically offset. On the upper or underside of each shelf or cabinet unit there is provided a shaft which extends transversely to the chain between the two reaches thereof and this shaft is equipped with a handle lever at that end accessible for service. Attached to the shaft of each unit is a swivel arm. This arm is provided at its free end with two oppositely directed three-pronged forks serving as chain-engaging dogs, the middle prong of which enters into a link of the upper or lower reach of the endless chain, depending on the position of the service lever and the desired shift direction, so that after connection of the electric motor drive to the chain one or the other shelf or cabinet units bordering the passageway is shifted.

In this construction each service lever is attached by an articulated joint to a lock bar which runs parallel to the floor and which can be locked in three positions. The locking bar's length corresponds to the width of the front wall of a shelf or cabinet unit. When the shelf or cabinet units are standing side by side practically without play, all of the locking bars abut each other at their ends so that the service lever of a shelf or cabinet unit bordering the passageway after its unlocking can be swivelled only in the direction of the passageway and therefore can be coupled by way of the swivel arm only with the chain reach running in this direction. The swivelling of the service lever results in a corresponding shift of the proper locking bar, so that one of its ends projects somewhat into the passageway. As soon as the shelf or cabinet unit coupled to the chain approaches the opposite unit, which is spaced therefrom by the width of the passageway, the locking bar is pressed back by its contact with said opposite unit. The service lever swivels back into its middle position and disengages the connection between chain and swivel arm and chain-engaging dogs the result being that this shelf or cabinet unit is stopped and two additional shelf or cabinet units are freed for service.

This known device for effecting the sliding of shelf or cabinet units requires a relatively large construction height because both reaches of the endless chain are at different heights, with their spacing being determined by the pitch diameter of the chain sprockets and also by the coupling devices between the two chain reaches. Also, this kind of coupling necessitates a strong and exact guiding for the two chain reaches, because otherwise they can jump from the fork prongs acting as the chain-engaging dogs. This can happen particularly when the mechanism is started. If a gerat construction height is required, however, the effective height for the shelf or cabinet units is reduced, and in addition the strong and exact guiding of the chain increases the costs considerably. Consequently the known device described above must be considered uneconomical.

The object of the present invention consists, therefore, in improving the presently known devices for the shifting of units located behind each other on tracks as described in the preceding paragraphs so that smaller construction heights are required, the construction is more economical and wearing of the shifting mechanism is avoided.

According to the present invention the problem is solved by arranging the two reaches of the chain, belt or cable at the same height. Each shiftable shelf or cabinet unit is provided with two rotatable sprockets, or perhaps with a roller or something similar, constantly engaged with the respective reaches. All of the sprockets or rollers can be blocked by coupling devices against rotation in the desired shift direction. Each shelf or cabinet unit can be formed by two rows of shelves or cabinets connected back to back with each row having several units arranged side by side and connected by the side walls adjoining each other. Two coupling pins are used for alternatively blocking rotation of the two sprockets, rollers, etc., on each shiftable unit. The two coupling pins are disposed vertically with respect to the floors of the units and enter into an opening such as a gap between the teeth of the sprockets or an opening in the rollers. Each of the two coupling pins is connected by a joint to a lever arm and both of the lever arms are attached to a shaft which in turn extends to the outer side wall so that it is accessible to the operator. The shaft is equipped with an operating lever. The construction can also be carried out in such a manner that for the purpose of blocking the two sprockets, rollers, etc., the latter are so constructed that they are vertically adjustable and have on one front face thereof a clutch surface which is engageable with another clutch surface of equal size, which is firmly attached to the corresponding shelf or cabinet unit. To use the device every operating lever or its shaft can be provided with an operating contact engageable with a control device such as a switch in selectable positions of the operating lever. The control devices are attached to the respective shelf or cabinet units and they establish the circuit for the electric motor for driving the chain, belt or cable.

This arrangement reduces to a minimum the construction height necessary for the drive system and the coupling devices of the units so that the height available can be used to the greatest possible extent as shelf or cabinet space which of course, increases the capacity of the filing system greatly. In addition, the coupling device according to the present invention provides a dependable connection between the drive device and the shelf or cabinet units which means that the drive works more effectively and safely.

The drawings diagrammatically illustrate several embodiments of the invention.

In the drawings:

FIGURE 3 is a front view of a movable unit partially broken away to show the rotatable sprockets and the coupling device therefor in section.

FIGURE 4 is a front view of a shelf or cabinet unit mounted for travel on rollers.

FIGURE 13 is a fragmentary view of two adjoining shelf units on an enlarged scale.

FIGURE 14 is a section taken along the line XIV—XIV of FIGURE 13.

FIGURE 20 shows the filing system in a perspective view.

In each of the examples chosen to illustrate the invention, each of the slideable shelf or cabinet units 1 consists of two rows of shelves or cabinets 2 connected in back-to-back relationship. Each row may consist of several shelves or cabinets 2 arranged side by side and connected to each other by their adjoining side walls. Such a construction is especially advisable when an existing filing system, housed in individual cabinets which are used relatively infrequently, must be considerably enlarged without, however, additional room being provided. Of course, the shelf or cabinet units may have been constructed individually to begin with.

Figure 1:
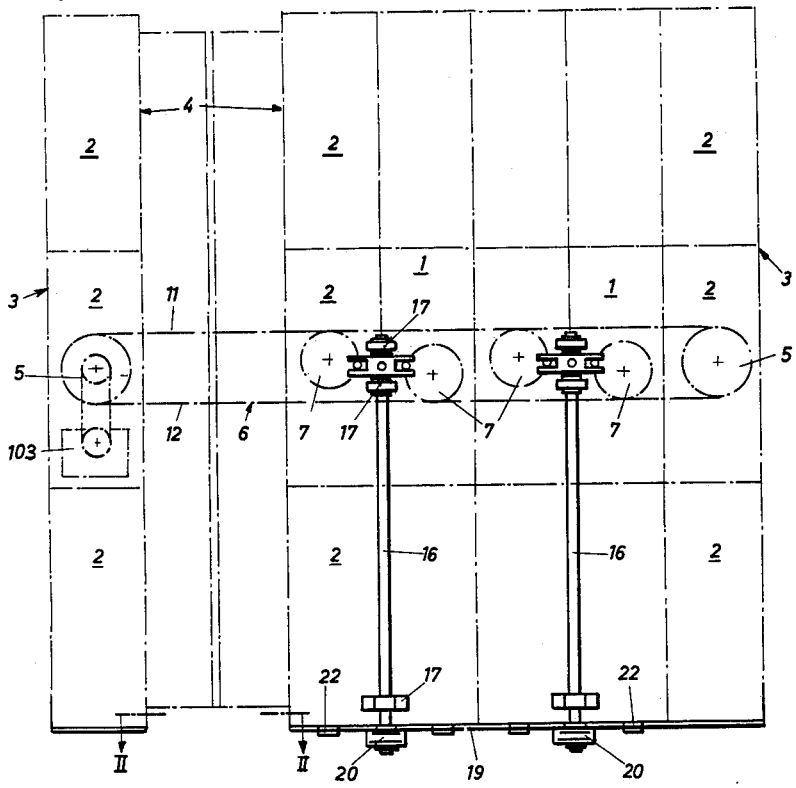
FIGURE 1 is a bottom view of two slideable shelf or cabinet units arranged between two fixed units with the outline of the units being shown in chain-dotted lines.

Referring to the embodiment illustrated in FIGURES 1 and 4, two shiftable shelf or cabinet units 1, movable by means of rollers 100 on tracks 101, are arranged tightly behind each other between two fixed, half-width shelf or cabinet units 3, with only a single passageway 4 remaining open. In FIGURE 1, the passageway is shown between the leftward fixed unit 3 and the leftward movable unit 1. The arrangement is effected in the ordinary fashion in such a manner that the access sides of adjacent units face each other. By shifting the movable units 1 the passageway 4 can be provided between any two units to which access is desired for filing purposes.

Since loaded shelves or cabinets 2 have a considerable weight, the shifting of the movable units is done by an electric motor 103 which by way of a transmission drive is adapted for rotating one of the two sprockets 5 shown (see FIGURE 1). Over these two sprockets 5 runs an endless chain 6 which extends in the direction in which the movable units can be shifted, i.e., vertical to the access sides of units 2. In place of the chain, a perforated belt or a cable can be used which may be wound several times around a direction changing device, such as a drum. The sprockets 5 are rotatably, but not shiftably, mounted below the fixed units 1 in such a manner that their rotational axes extend perpendicular to the floor on which the units are mounted. The reaches of the chain 6 are at the same height from the floor as the peripheries of the sprockets 7, a pair of which are provided on each of the shiftable shelf or cabinet units 1. To accomplish this, the two sprockets 7 on each shiftable unit 1 are mounted for rotation on the underside of base 8 of each shiftable wood or sheet metal shelf or cabinet unit by means of a bearing plate 9 and shafts 10, and are arranged in such a manner that one sprocket 7 is engaged with chain reach 11 and the other sprocket 7 is engaged with the other reach 12. Chain reach 12 runs in the opposite direction but at the same height from the floor as reach 11 of chain 6 (FIGURES 1 and 3). Both reaches 11 and 12 are confined on their outer sides by a retainer 104 which has a substantially Z-shaped cross section.

To make possible the selective movement of the units 1 by the endless chain 6, a coupling device 13 is provided for each shiftable unit 1 (see FIGURE 3). This device, for instance, can comprise two coupling pins 14 guided shiftably in the bearing plate 9. Corresponding one end of the pins 14 can alternatingly be inserted into the gaps between the teeth of the sprockets 7. The other ends of said pins are connected by a joint with the ends of a two-armed lever 15. Each two-armed lever 15 is mounted on a shaft 16 for arcuate movement thereby. This shaft 16 is rotatably mounted above or below, here above, the base 8 of each unit 1 in bearing blocks 17 and one of its ends protrudes somewhat beyond the front wall 19 of the unit. This wall 19 is accessible for service (FIGURE 1).

The protruding end of the shaft is equipped with an operating lever 20. In the middle position of this lever, which is somewhat perpendicular to the floor, and which can be secured by a stop, a holding device or something similar, the free ends of the coupling pins 14 are positioned above the sprockets 7, i.e., the coupling pins are not engaged with the sprockets. The sprockets 7 are then free to rotate and no movement of the units takes place. By swinging lever 20 into one or the other end position one or the other of the coupling pins 14 is moved into engagement with its associated sprocket 7, the sprockets being continuously meshed with the reaches 11 and 12, respectively. When the coupling pin 14 blocks rotation of a sprocket, the appropriate shelf or cabinet unit is moved in the desired direction by the chain reach 11 or 12 with which it is then coupled.

A movable locking bar 21, guided by brackets 22, is located parallel to the floor at a predetermined height on the front wall 19 of each shiftable unit 1. The length of this locking bar is approximately equal to that of the front wall and said bar is connected by means of a bolt 23 which extends into an elongated slot in the operating lever 20, so that locking bar 21 can move linearly in response to swinging movement of the lever 20. Because of the locking bar 21, lever 20 can be swung only in the direction of the open passageway 4, because in the other direction the locking bar 21 hits the locking bar 21 on the adjoining unit 1. The operating lever 20 or the shaft 16 or the locking bar 21, here the lever 20, carries a switch actuator 105, which is alternately engageable with switches 106 on the shelf or cabinet unit in the two respective end positions of the lever 20. The switches 106 are connected in circuit with the drive motor 103 for the chain, belt or cable so that the motor can only be connected with an electric current source when the sprocket 7 required to be held against rotation in order for the shift to occur is in fact so held by the appropriate coupling pin 14.

In the embodiment according to FIGURE 3 the locking bars 21 are each provided with two U-shaped, indentations 24 with rounded corners, in which in the terminal positions of operating lever 20 a detent in the form of a spring equipped ball 107 mounted in the brackets 22 can be received. Such occurs when the electric circuit of the motor is closed.

Another embodiment of a coupling device is shown in FIGURES 5–8. Each sprocket 7 is arranged so that its height can be adjusted. On the upper side of the sprocket facing the base 8 of the unit 1, the sprocket has a clutch surface 25. To adjust the height, sprocket 7 is freely rotatably mounted on one end of an axially movable shaft 26. The shaft 26 is vertically shiftable inside of a sleeve 27 which is stationarily mounted on the base of the unit. The upper end of the shaft 26 is provided with a loop-like bearing eye 28. The latter has a diameter somewhat larger than that of shaft 26 and forms a shoulder which can rest on the upper end of the sleeve 27 when the shaft is in its lowermost position. An eccentric 29 extends into the bearing eye 28. The eccentric 29 is affixed to a short shaft 31 mounted in bearing blocks 30 and said shafts are pivotable by a lever 32 fixed thereto in such a manner that when this lever is pressed down shaft 26 is raised up which also raises the sprocket 7.

A ring 33 is attached to the sleeve 27 at a small distance above sprocket 7. The ring surface facing the sprocket also is formed as a clutch surface 25. The clutch surfaces 25 which face each other can, for instance, be provided with teeth 34 which have the shape of saw teeth and extend radially (see FIGURE 8), with the result that by lowering the lever 32, advantageously against the force of a spring (not shown), shaft 26 is lifted up through eccentric 29 and the teeth of the two coupling surfaces 25 are engaged with each other without practically any play.

Figure 9:
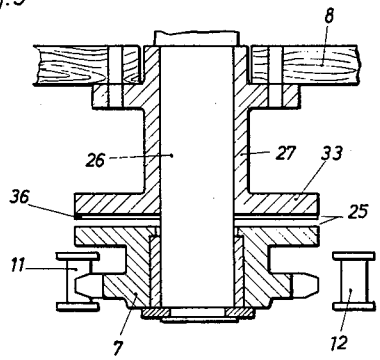
FIGURE 9 is a view similar to FIGURE 5 of another modification of the coupling device.
Figure 8:
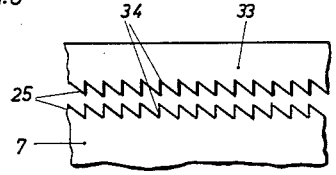
FIGURE 8 is a schematic view on an enlarged scale of the coupling surfaces of coupling device illustrated in FIGURE 5.

According to FIGURE 9, the coupling surfaces 25 between the fixed and the movable clutch parts, i.e., between ring disk 33 and sprocket 7, can also be constructed flat and can be equipped with friction surfaces 36. Instead of claw couplings and especially of friction couplings it is also possible to employ electromagnetic clutches. The latter have the additional advantage that the electric circuit is simplified for the electro-motor drive device.

Downward movement of lever 32 on each of the short shafts 31 equipped with eccentric 29 is brought about by a finger 37. The two fingers 37 belonging to each of the units 1 are attached to and extend in opposite directions from a shaft 16a shown in FIGURE 7, which otherwise is the same as the shaft 16 in the first described embodiment and which specifically is provided with an operating lever 20 and a locking bar 21. The arrangement operates such that upon swivelling of the operating lever 20 into one end position one finger 37 moves downwardly pulling shaft 26 up via the lever 32 and eccentric 29, while the other finger 37 swings into an unengaged high position. In the opposite end position of the operating lever 20 the same coupling operation for connecting the other sprocket 7 to its unit is effected.

Also in the device explained above for the shifting of units arranged or resting behind each other on tracks 101 the normal measures of precaution are carried out so that the separated shelf or cabinet units are not pushed together unintentionally as long as somebody is still in the passageway.

Figure 2:
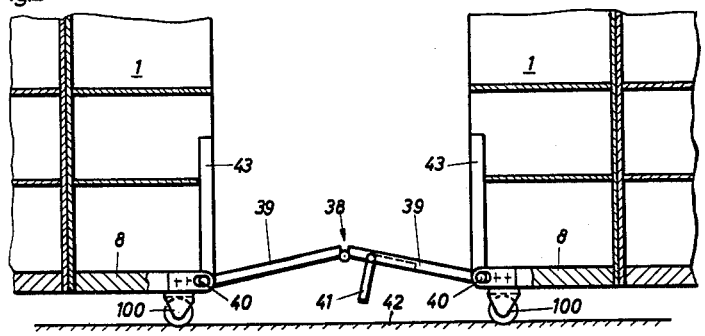
FIGURE 2 is a sectional view taken along the line II—II of FIGURE 1.
Figure 5:
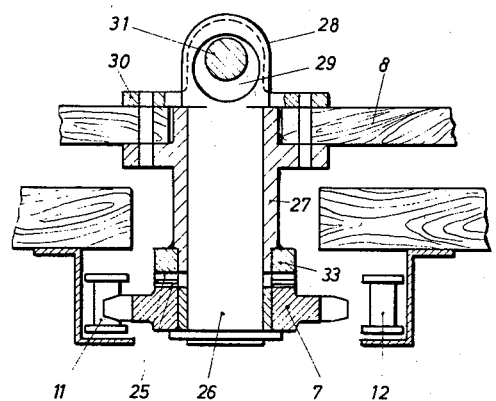
FIGURE 5 is a fragmentary central sectional view through a modified coupling device and sprocket.
Figure 6:
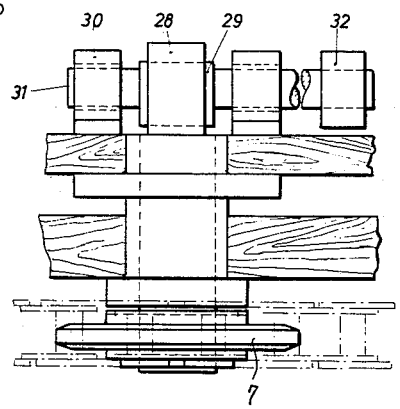
FIGURE 6 is a fragmentary elevational view of the modified coupling.
Figure 7:
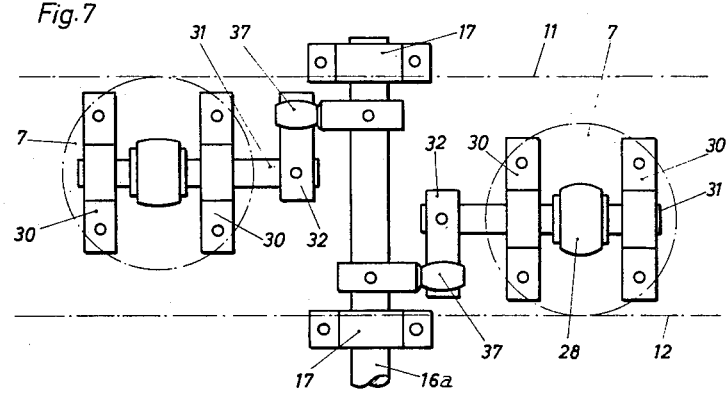
FIGURE 7 is a bottom view of a slideable shelf or cabinet unit equipped with the coupling devices and sprockets shown in FIGURES 5 and 6.

To accomplish this every shiftable unit 1 is connected by joints with the next following or adjoining unit along its entire length by an auxiliary floor 38 which can be folded around its lengthwise center by hinges (see FIGURE 2). Each floor section 39 is joined along its free lengthwise side by means of bolts (which are movable to a limited extent), or else by a similarly located shaft 40, to its associated unit 1 at the level of its base 8, with torsion springs being present on the shafts which urge or swivel the floor sections upwards so that the auxiliary floor will always have the tendency to assume the position shown in FIGURE 2. Resting on the lower side or one floor section 39 or of both floor sections are contact supports 41 or leaf springs which are normally off the floor because of the aforementioned spring pressure. The supports are of such length that in the horizontal position of the auxiliary floor 38, said supports rest on grounded tracks 42. Contact supports 41 also are connected in the electric circuit of the driving motor for the chain, belt, or cable. If, therefore, someone is in the passageway and standing on the floor 38, then the circuit of the electro-motor drive is open and the latter cannot be closed by anyone else. In order that the units 1 can be pushed together completely and without play in spite of the intermediary auxiliary floors 38, an indentation 43 is provided in the side walls on the access side of each unit. This indentation corresponds in size to floor section 39 and the floor section swings into it when the units are pushed together.

Figure 12:
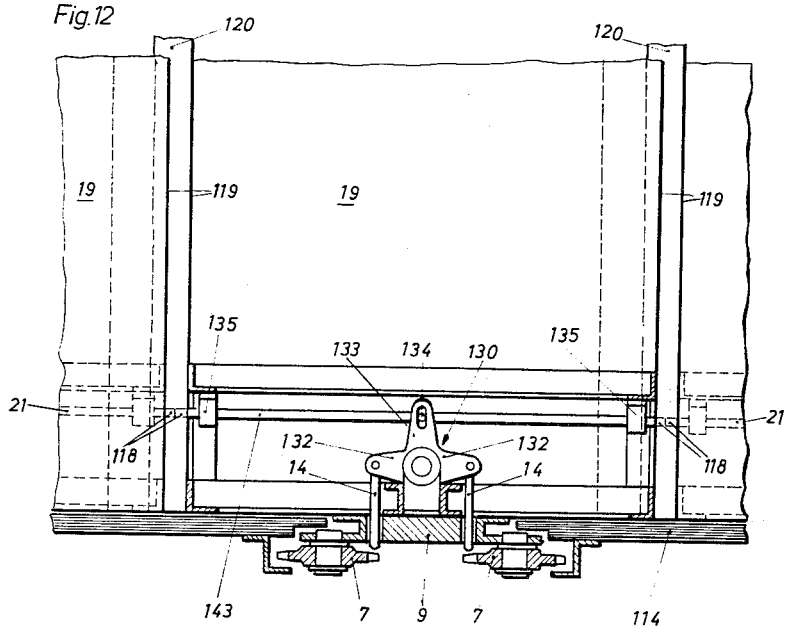
FIGURE 12 is a view similar to FIGURE 11, but showing a modified construction of the lock bar.
Figure 15:
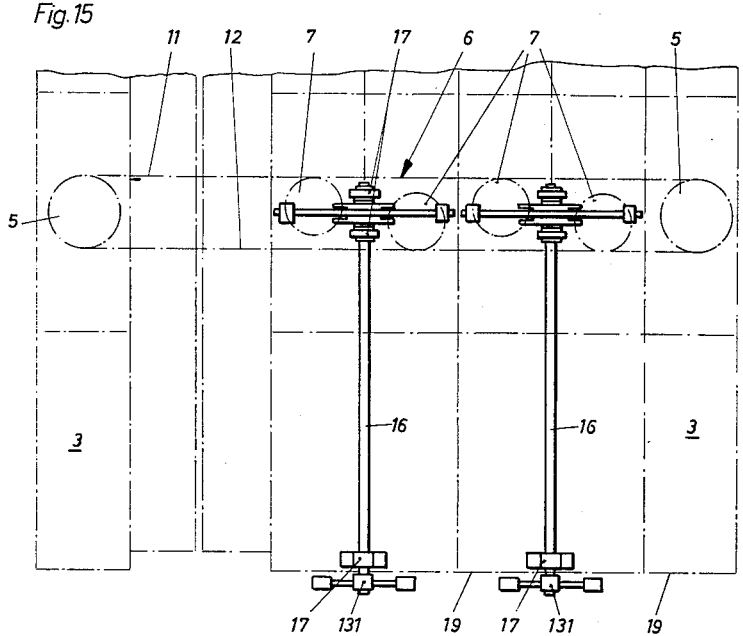
FIGURE 15 is a bottom view of the shelf units with a modified construction of the coupling operating device.
Figure 16:
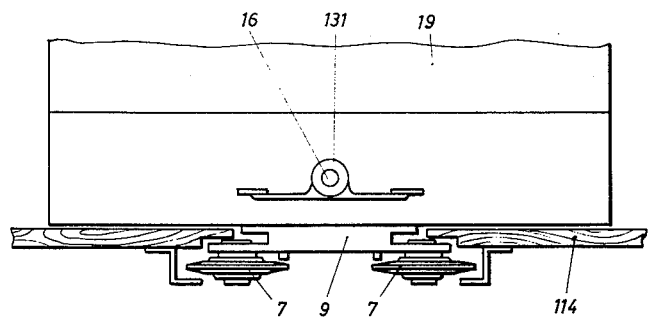
FIGURE 16 is a front elevational view of a shelf unit according to FIGURE 15.

As shown in FIGURE 12, instead of the two-armed lever 15, a three-armed lever 130 can be attached to shaft 16. The protruding end of shaft 16 holds a two-armed, rocker-like foot lever 131 (FIGURES 15 and 16).

The three-armed lever 130, has two equally large laterally extending lever arms 132 and a vertically extending lever arm 133. If foot lever 131, by pressure exerted downwardly on one or the other of its lever arms, is swiveled in one or the other direction, then shaft 16 turns with the lever 130 and the coupling pin 14 located on the side in which the shaft 16 is turned, enters into a tooth gap of its associated sprocket 7 and blocks this sprocket against rotation.

A bolt 134 of a lock bar 143 extends into a slot in the lever arm 133. This locking bar, as shown in FIGURE 12, is about as long as the shelf or cabinet units are wide and it is supported for lengthwise sliding movement by the support brackets 135. When foot lever 131 is pressed down locking bar 143 is shifted in the direction in which the shaft 16 swivels so that it protrudes beyond the side wall of its associated unit.

Figure 17:
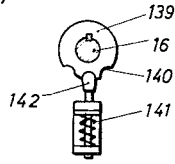
FIGURE 17 is a detail of a modified detent device for the coupling actuating shaft.
Figure 18:
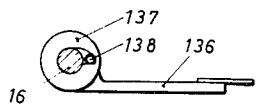
FIGURE 18 and FIGURE 19 show details of the coupling operating device according to FIGURES 15 and 16.
Figure 19:
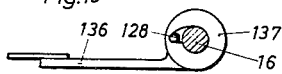

In order to prevent the possibility that upon the pressing back of the locking bar 143 the rocker-like foot lever 131 will also move in a delayed fashion, both arms 136 (FIGURES 18 and 19) of the foot lever can be constructed independently of each other, with each having a hub 137 of its own. Built into each hub is a known freewheeling or one-way clutch arrangement 138 for coupling the hub with the shaft 16 to effect a rigid connection between these two parts only when the hub is moved in the proper coupling direction. The two arms 136 of the foot lever are swivelable against the force of a spring (not shown) in the coupling direction, so that upon removal of the operator's foot they return directly to their starting position. The turning of the shaft 16 caused subsequently by locking bar 143 will then not affect the foot lever 131 at all. The shaft 16 can be releasably held in its middle position and its two final positions by means of a notched disk 139 (FIGURE 17) attached to the shaft 16 into whose notches 140 can be received a detent pin 142 acted on by spring 141.

Figure 10:
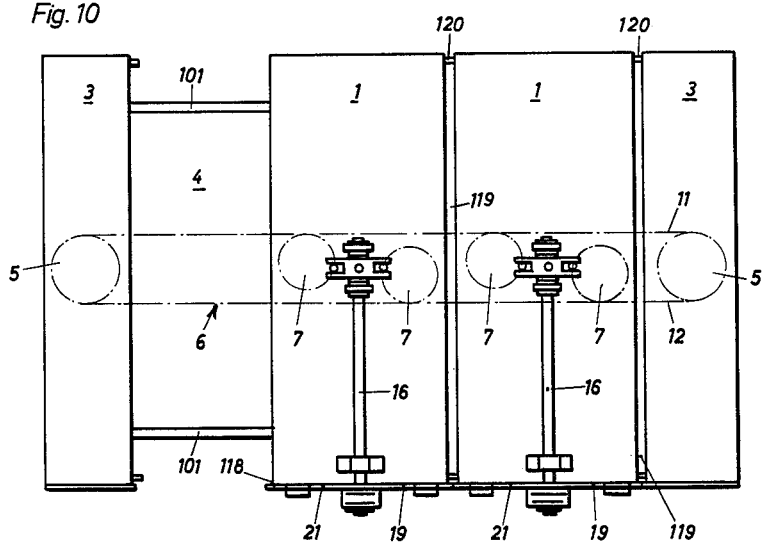
FIGURE 10 is a view similar to FIGURE 1 showing the units in solid lines with extensions of the lock bars protruding from the sides of each of the units.

The embodiment of a filing system comprising shiftable and fixed units arranged behind each other (see FIGURES 10 and 11) corresponds in its essentials to the embodiment according to FIGURES 1 and 3. Between the two fixed units 3 there are two or as many shiftable shelf or cabinet units 1 as desired, which are mounted for movement on the tracks 101 running transversely to them. Of course, the end units 3 can also be attached shiftably.

Tracks 101 are mounted on the floor 42 as is also a chain 6 which extends generally symmetrically with respect to the lengthwise centerline between the tracks 101 and parallel to the floor. This endless chain 6 has reaches 11 and 12 running in opposite directions.

To safeguard against unexpected movement of units 1 while someone is in the passageway 4, the portion of the floor 42 covered by the shiftable units can be lined with a plastic switch material into which are welded strip switches which are connected in parallel at short distances from each other. These strip switches each consist of upper and lower switch strips, which close a low-voltage, switch-off circuit that prevents operation of the electric drive motor. The pressure for this purpose can be exerted anywhere along the switch carpet. In this manner, or through the safety device according to FIGURE 2, it is assured that the units 1 can not be moved while a person is in the passageway. If, however, the person is outside of the passageway and bends for one reason or another into the passageway, or handles the outer units from the outside, or puts his hand into one of them, then there still exists the danger of injury or damage caused by an unexpected engagement of a movable unit to the endless chain, belt, or cable. This problem is especially acute when the filing system is served from two sides and must be entered frequently.

To eliminate these dangers, both ends of each locking bar 21 can be extended beyond the edges of the side wall 19, when the bar is in its center position, the amount of such extension corresponding to half the width of space 119 which is provided between adjacent units when they are closest to each other. The width of this space 119 will be about equal to that of a finger or a hand, so that a hand or finger held between the adjacent units cannot be crushed. It will be noted that when the pin protruding extensions 118 of adjacent locking bars 21 abut during movement of one unit with respect to the other, the locking bar on the moving unit shifts to the center position and uncouples coupling pin 14 of the moving unit 1 from the endless chain. Naturally such extensions 118 can also be provided on the locking bars 143 according to FIGURE 12.

Figure 11:
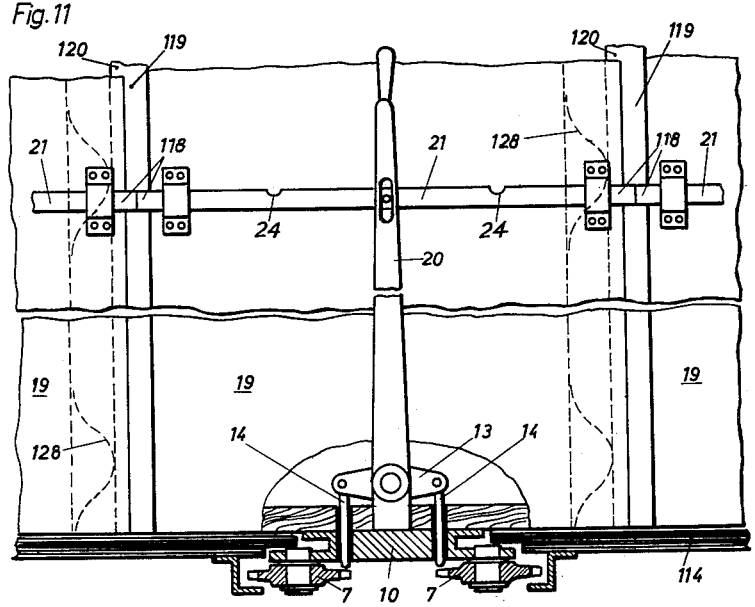
FIGURE 11 is a front elevational view of a shelf unit according to FIGURE 10 with a part of the front wall being broken away and the parts therebehind being shown in section.

In order that units which are pushed together, yet separated from each other by the width of space 119, present a closed front and so that the filed objects can be protected against dust, every space 119 can be covered between the side walls 19 bordering the space, by a ledge 120. Each ledge 120 is mounted in a lengthwise groove 121 of a side wall 19 of one of the units in a resiliently yieldable manner so that it can be relatively easily pushed back inside its side wall 19. For instance, the ledge 120 can be yieldably supported by soft springs 122 which are held in special drill holes 123 in the base 124 of the groove. The springs 122 surround pins 125 secured to the ledge 120 (see FIGURES 13 and 14). The weight of ledge 120 is supported by means of bolts 126 secured in the side wall 19 and which pass through slots 127 in the ledge 120. In place of coil springs 122 soft leaf springs 128 can be arranged in the groove 121 and attached to its associated ledge 120 (FIGURE 11). It is also possible to use elastic foam rubber strips in each groove 121 for this purpose.

To protect each space 119 completely against dust it is also possible to expand the floor and the ceiling of each unit either wholly or by half of the width of the space 119. For the purpose of widening it a special ledge of wood, rubber, plastic or similar material can be used.

An additional safeguard for the protection especially of the upper part of the body of a person bending into passageway 4 can be provided by equipping the floor 124 of each groove 121 with an electric switch device which is connected in the circuit of the electric drive motor or in a special stopping circuit for the latter. If, for instance, the upper part of the body is projected into the passageway 4 at the moment when the adjoining shelf or cabinet units are pushed together, then when the moving unit strikes the body, the ledge 120 is pushed into its groove 121 to close switch arrangement and, hence, shut off the electric drive motor immediately. The switch arrangement in this situation can also consist of a switch base 129 having a wrapped strip switch 130. It is especially possible to arranged the switch base in the manner of a sliding door on the free narrow surface 131 of each ledge 120 or even on the opposite narrow surface 131 of the corresponding side wall 19 (see FIGURE 14).

Although particular preferred embodiments of the invention have been described above in detail for illustrative purposes, it will be recognized that variations or modifications of such disclosure, which lie within the scope of the appended claims, are fully contemplated.

What is claimed is:

1. Filing apparatus comprising a plurality of filing units which are shiftable along tracks mounted on a floor so that a passageway can be formed between adjacent units;

an electrically driven drive device;

an endless flexible drive element arranged in the form of an elongated loop and connected to said drive device for being driven thereby, the two opposing longitudinally extending reaches of the loop being arranged in substantially the same plane, said drive element having regularly spaced drive members mounted thereon;

a pair of rotatable elements mounted on each filing unit for free rotation with respect thereto, the rotatable elements having radial projections in constant positive engagement with the drive members on the respective reaches of said drive element for being rotated thereby;

coupling means mounted on said filing units, said coupling means including displaceable means for engaging said rotatable elements and blocking rotation of each rotatable element with respect to the filing unit on which it is mounted; and operator means for alternatively operating said coupling means for the respective rotatable elements on each filing unit so that the filing unit can be drivingly connected to one or the other of the reaches of said drive element.

2. Filing apparatus according to claim 1, in which the filing units each are comprised of two rows of shelves or cabinets connected back to back with each row consisting of several shelves or cabinets arranged side by side and connected with each other at their adjoining side walls.

3. Filing apparatus according to claim 1 in which each shiftable filing unit is connected with the adjacent unit by an auxiliary floor which is hinged in the middle, the side edges of said auxiliary floor being connected pivotally and for a limited amount of transverse movement to the two units and which on its underside is equipped with pivotally mounted contact supports which are resiliently urged downwardly for engagement with the floor.

4. Filing apparatus according to claim 3, in which each section of the auxiliary floor is receivable in a large recess in the side wall of the adjoining filing unit.

5. Filing apparatus according to claim 1, in which the coupling means on each filing unit includes two coupling pins engageable with the rotatable elements for blocking rotation thereof, said pins extending substantially vertically to the bottom of the filing unit and being receivable into recesses in the rotatable elements, each of the pins being joined to one end of a two-armed lever arm which is attached to a shaft protruding from the service-accessible side wall of the filing unit, said shaft having an operating means connected thereto.

6. Filing apparatus according to claim 1 including an operating lever for operating both coupling means of each unit, switch means operable in response to position of the lever of controlling the supply of electrical energy to said drive device.

7. Filing apparatus according to claim 1, in which the coupling means are operable by a pivotable shaft which is connected with a locking bar, which is located in the middle between the two reaches of the endless drive element, the locking bar being connected to one arm of a lever, the lever having two further arms, each of which has a coupling pin mounted thereon for operating one of the coupling means.

8. Filing apparatus according to claim 7, in which a two-armed, rocker-like foot lever is provided on the shaft protruding beyond the side wall of the filing unit.

9. Filing apparatus according to claim 8, in which the two arms of the rocker-like foot lever are independently mounted on the shaft, a one-way clutch between each arm and the shaft so that said shaft is pivoted only when the respective arms are moved in one direction with respect to the shaft, and resilient means urging the arms in the opposite direction.

10. Filing apparatus according to claim 1, in which the drive element is a chain and in which the rotatable elements are sprockets.

11. Filing apparatus according to claim 1, including means supporting each rotatable element for rotation about an axis which is substantially perpendicular to the plane defined by the loop and for vertical movement along said axis, each rotatable element having a clutch surface on one side thereof, and an opposed corresponding clutch surface attached to the filing unit so that engagement of the clutch surfaces locks the rotatable element to its associated filing unit.

12. Filing apparatus according to claim 11, in which the rotatable elements are each mounted for free rotation on one end of a vertically moveable shaft, said shaft having a bearing eye on its other end, and eccentric rotatable about a substantially horizontal axis and disposed within said bearing eye for moving said shaft vertically and a control lever for rotating said eccentric.

13. Filing apparatus according to claim 1, including an operating lever for operating both coupling means of each unit, a locking bar on each filing unit and means supporting same parallel with the floor and for lengthwise sliding movement toward and away from the adjacent filing units, means connecting said locking bar to said operating lever so that movement of said lever also moves said bar, said locking bar being of at least substantially the same length as the depth of the filing unit so that the locking bar projects beyond the side edges of its filing unit when two units are close together to provide a space therebetween.

14. Filing apparatus according to claim 13, in which each space between two pushed-together units is coverable by a ledge which is yieldably mounted on one of the units.

15. Filing apparatus according to claim 14, in which the ledge is receivable in a groove in the side wall of its associated unit and is resiliently urged out of the groove.

16. Filing apparatus according to claim 15, in which a switch is mounted in association with the ledge and is connected in the circuit of the electric drive device in such a manner that when the ledge is pushed back into the groove the electric circuit is broken.

17. Filing apparatus according to claim 16, in which the switch is a strip switch enveloped in a switch carpet.

18. Filing apparatus according to claim 17, in which the top wall and the bottom wall of the units each have an extension covering one half of the space between the side walls of adjacent filing units.

References Cited by the Examiner

UNITED STATES PATENTS

| | | | |
|---|---|---|---|
| 358,685 | 3/87 | McNeill | 104—236 |
| 2,166,704 | 7/39 | Foulkes | 312—199 X |
| 2,555,244 | 5/51 | Pietrushak | 20—68 |
| 2,692,565 | 10/54 | Cummings | 104—236 |
| 2,706,573 | 4/55 | Ingold | 312—199 X |
| 2,772,639 | 12/56 | Ingold | 312—199 |

FRANK B. SHERRY, *Primary Examiner.*

CHANCELLOR E. HARRIS, *Examiner.*